(12) United States Patent
Fenske et al.

(10) Patent No.: US 7,788,299 B2
(45) Date of Patent: Aug. 31, 2010

(54) FILE FORMATTING ON A NON-TAPE MEDIA OPERABLE WITH A STREAMING PROTOCOL

(75) Inventors: Larry Alan Fenske, Loveland, CO (US); Richard Douglas Rector, Arvada, CO (US); Walter Wong, Boulder, CO (US); Matthew Thomas Starr, Lafyette, CO (US)

(73) Assignee: Spectra Logic Corporation, Boulder, CO (US)

( * ) Notice: Subject to any disclaimer, the term of this patent is extended or adjusted under 35 U.S.C. 154(b) by 338 days.

(21) Appl. No.: 10/980,594

(22) Filed: Nov. 3, 2004

(65) Prior Publication Data

US 2006/0112138 A1 May 25, 2006

(51) Int. Cl.
*G06F 7/00* (2006.01)
*G06F 17/30* (2006.01)

(52) U.S. Cl. .......................... 707/812; 703/23; 703/28
(58) Field of Classification Search .................. 707/205
See application file for complete search history.

(56) References Cited

U.S. PATENT DOCUMENTS

| | | | | |
|---|---|---|---|---|
| 4,446,516 A | * | 5/1984 | Nishimura | 711/100 |
| 4,586,027 A | * | 4/1986 | Tsukiyama et al. | 341/95 |
| 4,626,829 A | * | 12/1986 | Hauck | 341/63 |
| 4,775,969 A | * | 10/1988 | Osterlund | 369/53.1 |
| 4,949,367 A | * | 8/1990 | Huizing et al. | 378/84 |
| 5,247,646 A | * | 9/1993 | Osterlund et al. | 710/68 |
| 5,438,674 A | * | 8/1995 | Keele et al. | 711/4 |
| 5,454,098 A | * | 9/1995 | Pisello et al. | 703/24 |
| 5,463,772 A | | 10/1995 | Thompson et al. | |
| 5,491,808 A | * | 2/1996 | Geist, Jr. | 711/100 |
| 5,592,342 A | * | 1/1997 | Hall et al. | 360/48 |
| 5,630,092 A | | 5/1997 | Carreiro et al. | |
| 5,689,255 A | * | 11/1997 | Frazier et al. | 341/63 |
| 5,784,646 A | * | 7/1998 | Sawada | 710/38 |
| 5,813,011 A | * | 9/1998 | Yoshida et al. | 707/101 |
| 5,920,873 A | | 7/1999 | Van Huben et al. | |

(Continued)

FOREIGN PATENT DOCUMENTS

WO  WO 2005/010661 A2  2/2005

OTHER PUBLICATIONS

U.S. Appl. No. 10/950,613, filed Mar. 30, 2006, Starr et al.

(Continued)

*Primary Examiner*—Pierre M Vital
*Assistant Examiner*—Augustine Obisesan
(74) *Attorney, Agent, or Firm*—Kenneth Altshuler

(57) ABSTRACT

A method and apparatus for a generating a tape format like file with an associated look-up table on a non-tape storage medium is disclosed. In one configuration, a data storage arrangement can comprise a host computer in communication with a storage system by means of a streaming protocol. The storage system can comprise a non-tape storage medium having at least one file comprising a plurality of records each having user data and meta data wherein the meta data comprises data fields for and about the record. A table associated with the file is adapted to contain information related to at least one of the records. The table can be accessed by the storage system to reduce the amount of time spent locating the records.

18 Claims, 16 Drawing Sheets

U.S. PATENT DOCUMENTS

| | | | | |
|---|---|---|---|---|
| 5,991,776 | A * | 11/1999 | Bennett et al. | 707/205 |
| 6,047,356 | A * | 4/2000 | Anderson et al. | 711/129 |
| 6,076,151 | A * | 6/2000 | Meier | 711/171 |
| 6,085,262 | A * | 7/2000 | Sawada | 710/38 |
| 6,094,654 | A | 7/2000 | Van Huben et al. | |
| 6,128,698 | A * | 10/2000 | Georgis | 711/111 |
| 6,138,201 | A | 10/2000 | Rebalski | |
| 6,249,792 | B1 * | 6/2001 | Zwilling et al. | 707/205 |
| 6,260,110 | B1 * | 7/2001 | LeCrone et al. | 711/112 |
| 6,275,857 | B1 * | 8/2001 | McCartney | 709/226 |
| 6,446,183 | B1 * | 9/2002 | Challenger et al. | 711/170 |
| 6,606,287 | B2 | 3/2003 | Rust et al. | |
| 6,636,942 | B2 * | 10/2003 | Greco | 711/112 |
| 6,708,166 | B1 | 3/2004 | Dysart et al. | |
| 7,103,731 | B2 * | 9/2006 | Gibble et al. | 711/156 |
| 7,200,546 | B1 * | 4/2007 | Nourmohamadian et al. | 703/24 |
| 2002/0064118 | A1 | 5/2002 | Korfin et al. | |
| 2002/0144044 | A1 | 10/2002 | Moon et al. | |
| 2003/0135672 | A1 | 7/2003 | Yip et al. | |
| 2004/0098244 | A1 * | 5/2004 | Dailey et al. | 703/24 |
| 2004/0105187 | A1 | 6/2004 | Woodruff et al. | |
| 2004/0111676 | A1 | 6/2004 | Jang et al. | |
| 2004/0143597 | A1 | 7/2004 | Benson et al. | |
| 2004/0181388 | A1 * | 9/2004 | Yip et al. | 703/25 |
| 2004/0190216 | A1 * | 9/2004 | Yip et al. | 361/234 |
| 2004/0223253 | A1 | 11/2004 | Woodruff et al. | |
| 2004/0264037 | A1 | 12/2004 | Downey et al. | |
| 2004/0264038 | A1 | 12/2004 | Heineman et al. | |
| 2004/0264039 | A1 | 12/2004 | Armagost et al. | |
| 2004/0264040 | A1 | 12/2004 | Armagost et al. | |
| 2004/0264041 | A1 | 12/2004 | Kumpon et al. | |
| 2004/0264042 | A1 | 12/2004 | Pollard et al. | |
| 2005/0007692 | A1 | 1/2005 | Thompson et al. | |
| 2005/0010730 | A1 * | 1/2005 | Kano | 711/161 |
| 2005/0047258 | A1 | 3/2005 | Starr et al. | |
| 2005/0057847 | A1 | 3/2005 | Armagost et al. | |
| 2005/0063089 | A1 | 3/2005 | Starr et al. | |
| 2005/0065637 | A1 | 3/2005 | Lantry et al. | |
| 2005/0185323 | A1 | 8/2005 | Brace et al. | |
| 2005/0195517 | A1 | 9/2005 | Brace et al. | |
| 2005/0195518 | A1 | 9/2005 | Starr et al. | |
| 2005/0195519 | A1 | 9/2005 | Kumpon et al. | |
| 2005/0195520 | A1 | 9/2005 | Starr et al. | |
| 2005/0219964 | A1 | 10/2005 | Pollard et al. | |
| 2005/0246484 | A1 | 11/2005 | Lantry et al. | |
| 2005/0267627 | A1 | 12/2005 | Lantry et al. | |
| 2006/0143376 | A1 * | 6/2006 | Matze et al. | 711/111 |

OTHER PUBLICATIONS

U.S. Appl. No. 10/951,321, filed Mar. 30, 2006, Wong.
U.S. Appl. No. 11/011,812, filed Jun. 15, 2006, Starr et al.
U.S. Appl. No. 11/019,911, filed Jun. 22, 2006, Curtis et al.
U.S. Appl. No. 11/037,985, filed Jul. 20, 2006, Permut et al.
U.S. Appl. No. 11/040,937, filed Jul. 27, 2006, Starr et al.
U.S. Appl. No. 11/089,749, filed Sep. 28, 2006, Starr et al.
U.S. Appl. No. 11/123,725, filed May 4, 2006, Rector et al.
U.S. Appl. No. 11/126,025, filed Nov. 16, 2006, Rector et al.
U.S. Appl. No. 11/145,768, filed Dec. 7, 2006, Downey et al.
U.S. Appl. No. 11/230,146, Starr et al.
U.S. Appl. No. 11/240,893, Starr et al.
U.S. Appl. No. 11/264,920, Lantry et al.
PCT Application No. US05/45168, Spectra Logic Corporation.
PCT Application No. US05/46447, Spectra Logic Corporation.

* cited by examiner

TYPE-1 Table for File A — 800, 802, 804

| Repetitions | Record size |
|---|---|
| 2 | 50K |
| 1 | 100K |
| 1 | 50K |
| 1 | 150K |
| 1 | 25K |
| 1 | 50K |
| 1 | 100K |
| 1 | 25K |

TYPE-2 Table for File A

| Counter | Record size running sum |
|---|---|
| 0 | 0 |
| 1 | 50K |
| 2 | 100K |
| 3 | 200K |
| 4 | 250K |
| 5 | 400K |
| 6 | 425K |
| 7 | 475K |
| 8 | 575K |

FIG. 9

FILE FORMATTING ON A NON-TAPE MEDIA OPERABLE WITH A STREAMING PROTOCOL

CROSS-REFERENCE TO RELATED APPLICATIONS

None.

FIELD OF THE INVENTION

The present invention relates generally to generating a tape-like formatted file with an associated look-up table on a non-tape storage medium.

BACKGROUND

Data storage libraries are generally comprised of drive storage devices adapted to read and write data to and from media often archived within the libraries. Traditionally, tape media has been used in many of the mainstream storage libraries due to the relatively high storage capacity and data integrity robustness of tapes. As a consequence, a multi-billion dollar a year industry has been built around tape media. Due to innovations and rapid improvements in the general field of data storage technology, other types of storage media are beginning to compete in the tape storage arena. However, because of momentum generated by the tape industry, as well as certain persevering attributes of tape, the market has been reluctant to fully adopt the new technologies. For this reason, many new, non-tape storage technologies are being integrated with tape library systems instead of fully replacing them.

Among the new, non-tape storage technology solutions being integrated with tape library systems are disc drives. Disc drives are of a variety of random access memory devices that are especially able to handle high data throughputs with the capacity to store comparable amounts of data relative to tape cassettes. There are certain advantages and disadvantages to both tape media and disc drives, however. Disc drives are generally less robust and more expensive than tape media, but have high speed random data access whereas tape media accesses data in a linear fashion. Notably, present storage systems include software geared toward handling data in the linear fashion embodied by tapes, rather than the random access fashion embodied by disc drives.

In order to access (e.g., read, write, or manipulate) data on tape, data are fundamentally constructed in partitions that are encountered sequentially by a reader or writer, typically located in a storage drive device. User data, or data stored on behalf of a user, are generally partitioned as files which are further segmented into multiple records. Each data record starts with a header and ends with a trailer containing meta data, or information about the user data in the record. Meta data often contains information including identification of the header or trailer, version, meta data number, meta data length and record length, just to name one construct. The tape library system can locate certain positions on the tape in an efficient manner in both forward and reverse directions with the help of both the header and trailer meta data. These tape library systems rely on software architected specifically for tape media to locate particular data in files using meta data. Such software is typically incapable of accessing data stored on non-tape media, without modification.

The invention described herein is, therefore, generally directed to leveraging the benefits of non-tape media for use by systems and software that typically are specialized to work with tape media.

SUMMARY OF THE INVENTION

The present invention relates to generating at least one tape-like file on a non-tape storage medium and overcomes the disadvantages and limitations of the prior art by providing a method and apparatus for also generating and using a look-up table associated with each file for improving access time for records comprised in the tape-like file/s.

One embodiment of the present invention can therefore comprise a data storage arrangement comprising: a host computer; a storage system in communication with said host computer comprising at least one non-tape storage medium having at least one file comprising a plurality of records each having user data and meta data wherein said meta data comprises data fields for and about said record, and wherein said communication is by streaming protocol; a table associated with said file wherein said table is adapted to contain information related to at least one of said records; and an operating system level data directory having knowledge of at least said file and said table location in said storage system.

Other embodiments of the present invention may further comprise a method for improving performance in a data storage arrangement comprising: linking a host computer with a storage system; communicating with said storage system by said host computer with a streaming protocol; storing and retrieving data on a non-tape medium in the form of files comprising a plurality of records each having user data and meta data; generating a table associated with said file containing information related to at least one of said records using an operating system level data directory for locating at least said file and said table in said storage system.

Other embodiments of the present invention may further comprise a means for improving performance in a data storage arrangement comprising: means for communicating between a host computer and a storage system with a streaming protocol; means for storing and retrieving data on a non-tape medium in the form of at least one file comprising a plurality of records each having user data and meta data; means for generating a table associated with said file having information related to at least one of said records; and means for using an operating system level data directory for locating at least said file and said table in said storage system.

Further embodiments of the present invention may also comprise a method for minimizing the amount of locative information needed to access data stored on a non-tape medium, comprising the steps of: storing data from a tape medium format to a non-tape medium; and creating at least one table describing the location of the data on the non-tape medium, wherein the created at least one table is not a data directory.

BRIEF DESCRIPTION OF THE DRAWINGS

FIG. 8 is a diagram of a type-1 table constructed in accordance with an embodiment of the present invention.

FIG. 9 is a diagram of a base type-2 table constructed in accordance with an embodiment of the present invention.

DETAILED DESCRIPTION

Figure 1:
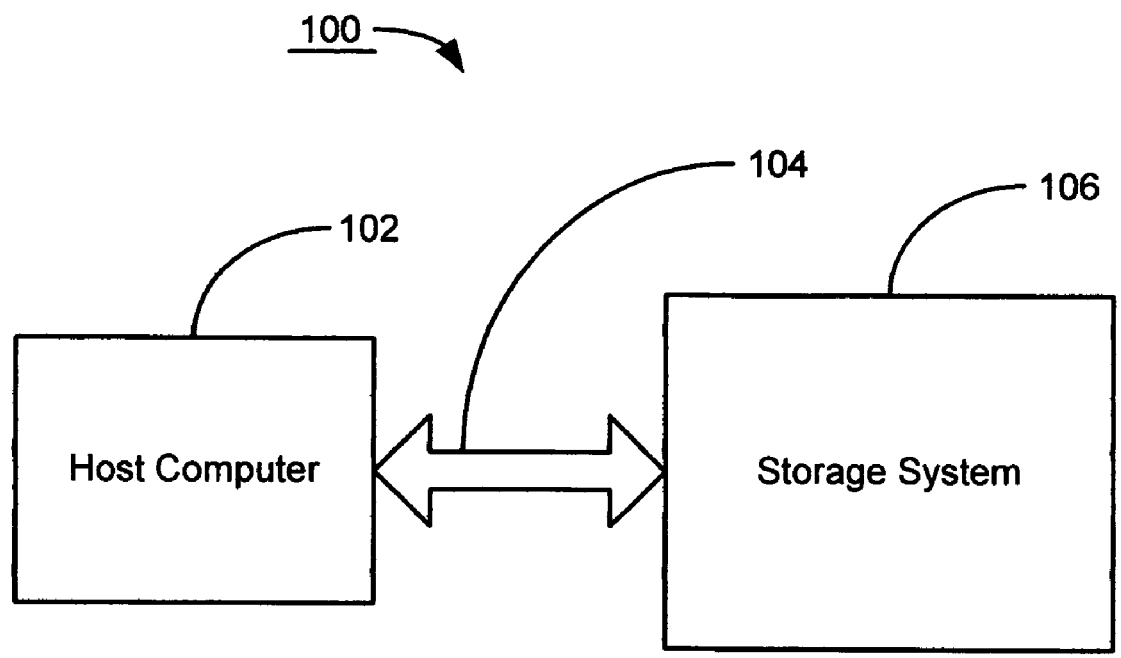
FIG. 1 is a block diagram of a data storage arrangement constructed in accordance with an embodiment of the present invention.

Referring to the drawings in general, and more specifically to FIG. 1, shown therein is a block diagram of a data storage arrangement 100 constructed in accordance with an embodiment of the present invention. In what follows, similar or identical structure is identified using identical callouts.

The data storage arrangement 100 is a block diagram of a host computer 102 in communication 104 with a storage system 106. The host computer 102 could be a personal computer, a main frame computer, or any computer system linked to the storage system 106, just to name a few examples. The communication path 104, at a minimum, needs only to facilitate communication between the host computer 102 and the storage system 106. The means for communication could be accomplished by a dedicated pathway (such as a SCSI-cabled connection) or, in alternative embodiment, a pathway over a network (such as a LAN, WAN, or other communication architecture), for example. Furthermore, the communication path could be in the form of a wire line pathway, wireless, or a combination thereof, for example. Finally, the storage system 106 is capable of storing and retrieving data for the host 102. Examples of a storage system include a disc drive or multiple disc drives, a storage library, such as a combination tape library and disc drive library or RAID (Redundant Array of Disc [drives]) system, just to name a few.

Figure 2:
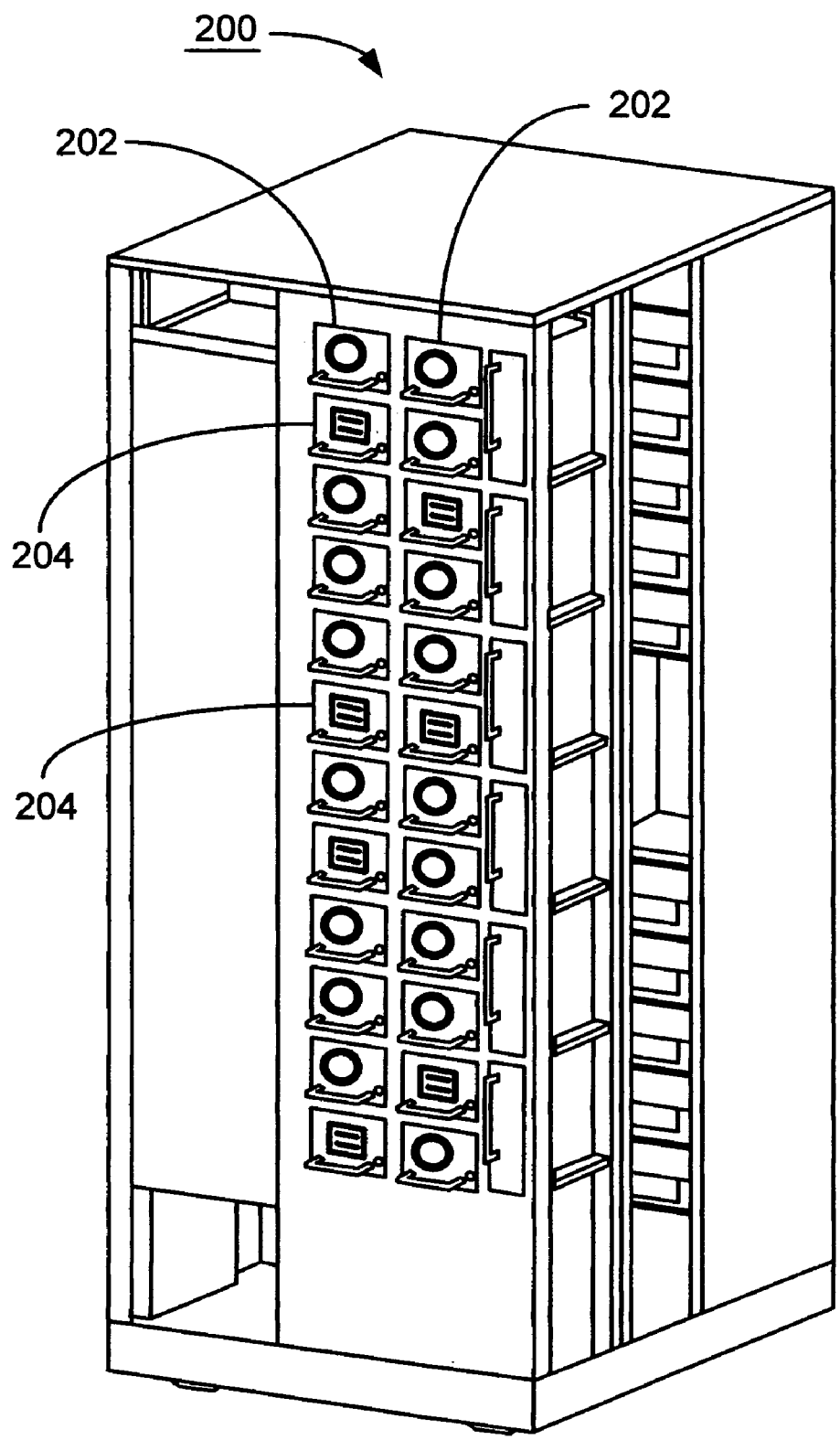
FIG. 2 is a pictorial representation of a combination tape and disc drive magazine library in accordance with some embodiments of the present invention.
Figure 3:
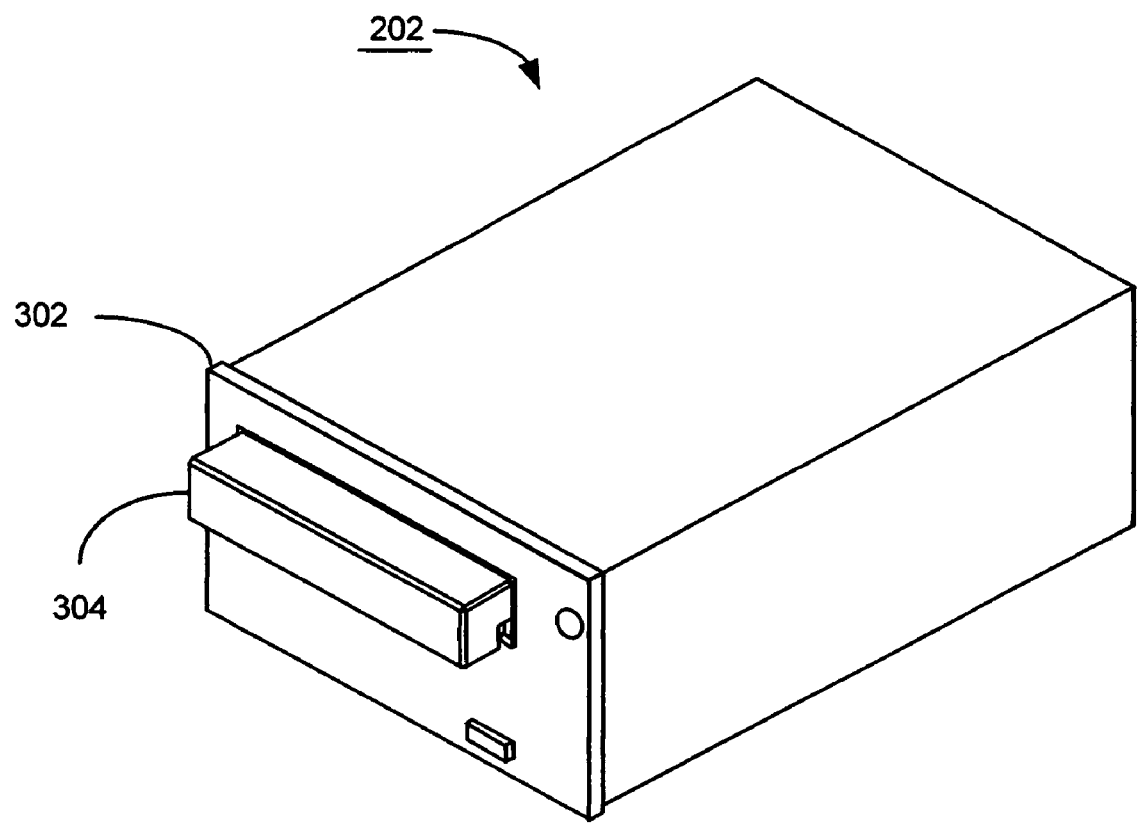
FIG. 3 is a pictorial representation of a tape drive accommodating a digital tape cassette.
Figure 4:
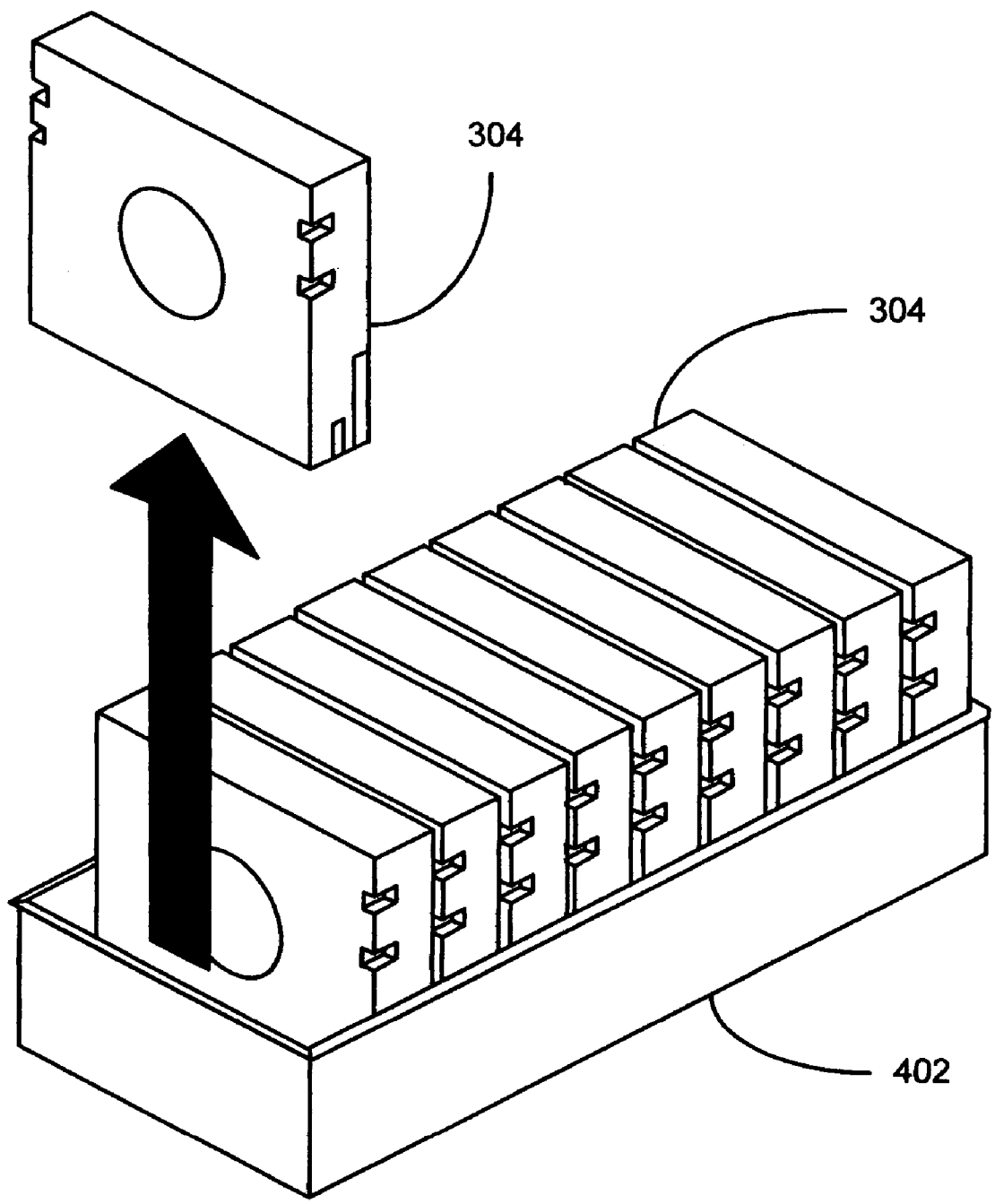
FIG. 4 is a pictorial representation of a tape cassette magazine supporting a plurality of tape cassettes.
Figure 5:
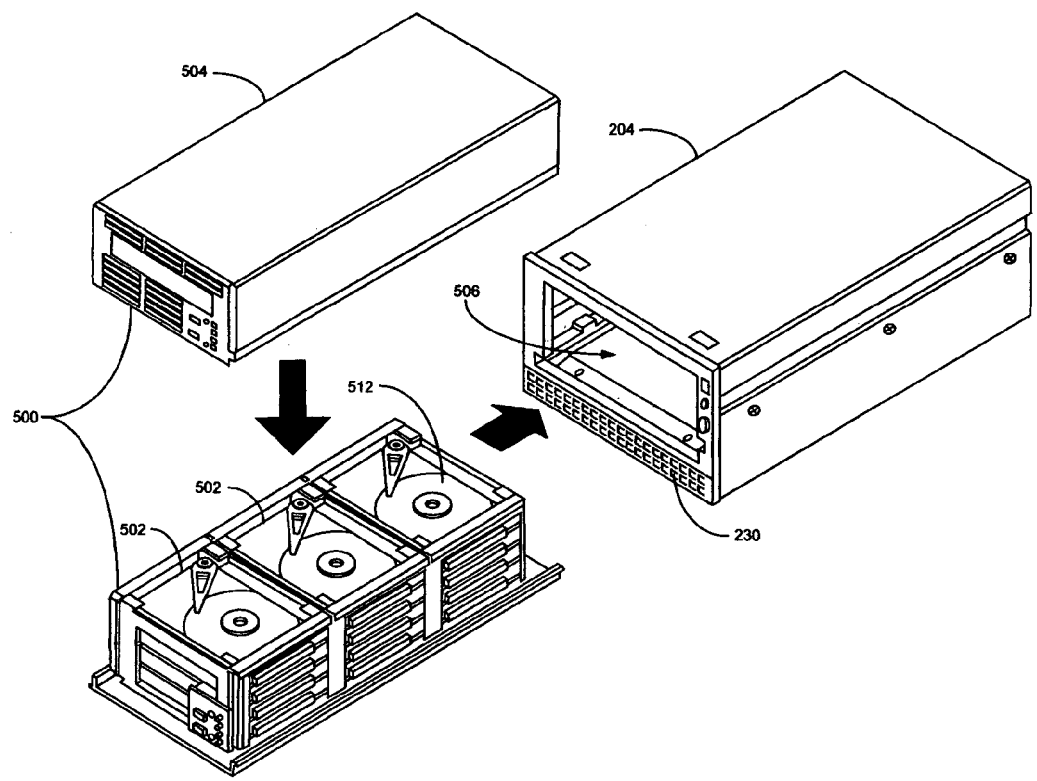
FIG. 5 is a pictorial representation of a mobile disc drive magazine and storage drive device.

FIG. 2 shows an example of a combination tape and disc drive magazine library 200. In this embodiment, the tape drive devices 202 and the disc drive magazine drive device 204 are operatively linked or connected to one another to function as a storage system 106. As shown in FIG. 3, one of the tape drive devices 202 is adapted to cooperate with a tape cassette 304 for reading and writing data. Here, the tape cassette 304 inserted in the tape drive device 202 through an accommodating opening in the drive face 302. FIG. 4 shows a tape cassette magazine 402 supporting a plurality of tape cassettes 304 which substantially contain tape media (not shown). FIG. 5 shows a non-tape storage media, which in the illustrative embodiment is a disc drive magazine 500 comprising a plurality of disc drives 502 stacked and contained by an enclosure 504. Each disc drive 502 has at least one disc type storage medium 512 for magnetically storing data. The disc drive magazine 500 could be used for direct storage of data or alternatively could be configured as a removable RAID, for example. As shown here, the disc drive magazine 500 could be inserted in an accommodating opening 506 in one of the disc drive magazine drive devices 204.

While the claimed invention has utility in any number of different applications, a disc drive 502 for use in the combination library 200 has been provided to illustrate a particularly suitable environment in which the claimed invention can be advantageously practiced. Here, the disc drive 502 is an embodiment of a non-tape media having certain advantages, such as data retrieval speed, over tape. Other non-tape media having random storage access could include a CD for use with a CDROM or other optical storage media, compact flash, floppy disc, just to name a few. In one embodiment of the present invention, a host computer 102 is capable of communicating with the combination storage library 200 by using one streaming protocol as if the combination library 200 were only a tape library, i.e., a library comprising only tape drives 202 for example.

Figure 6A:
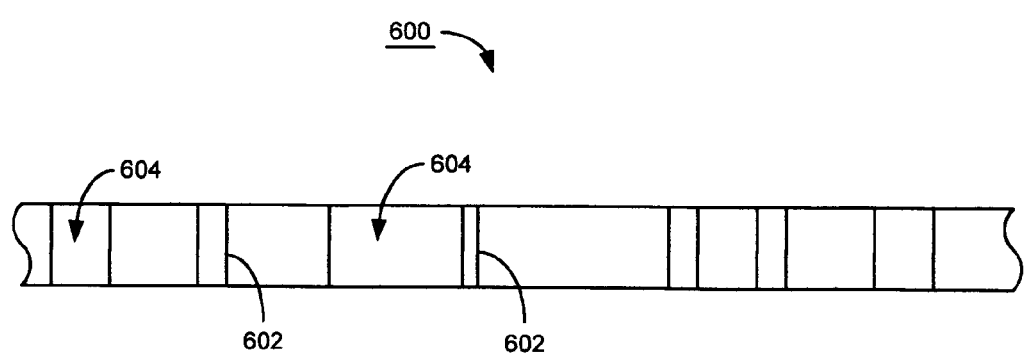
FIG. 6A is a block diagram illustrating a typical layout of files saved on a section of tape media used in a storage system supporting tape media.

FIG. 6A is a diagram illustrating a typical layout of files saved on a section of tape media 600 used in a storage system supporting tape media, such as the combination library 200. A tape library generally stores data in a linear manner as instructed by the streaming protocol from the host 102. Here, the data is stored in the form of files 604 separated by file markers 602.

Figure 6B:
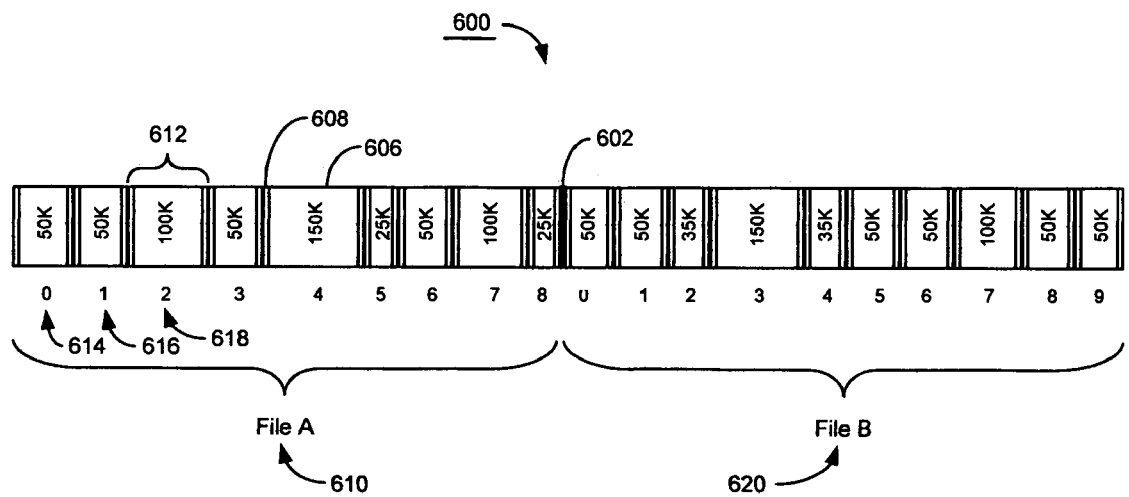
FIG. 6B is a more detailed block diagram from the section of tape media of FIG. 6A illustrating files constructed in a typical configuration for tape media.

Referring now to FIG. 6B, therein shows a more detailed perspective of a block diagram from the section of tape media 600 illustrating files constructed in a typical configuration for tape media. Herein, file A 610 and file B 620 are configured in a simplified construction. Referring to file A, for purposes of illustration, file A comprises nine records 612 wherein each record 612 comprises meta data 608 and user data 606. The data size of each record 612 can be identical or, as shown here, variable for the entire file 604 as exemplified by record zero 614 having a size of 50K bytes, record one 616 having a size of 50K bytes and record two 618 having a size of 100K bytes. In a tape configuration, the files 604 and records 612 generally run in sequential and contiguous order because of the linear access nature of tape. A host computer 102 using a streaming protocol generally makes data access requests 104 for a storage system 106 in the form of files 600 and records 612 with commands, for example space forward so many files and space forward so many records (also known as blocks in SCSI, Small Computer Systems Interface, protocol). The storage system 106 generally searches for a file 604, such as file A 610, using file markers 602. For example, if a host 102 wanted to access file number fifty-two on a specific tape cassette 304, for example, the tape cassette 304 containing the desired file 604 would be scrolled forward from the beginning of the tape medium (not shown) and the number of file markers 602 would be counted until file marker number fifty-two was identified. If a host 102 wanted to access a record number seventy-four in file number fifty-two then file number fifty-two would be found as described and record number seventy-four would be found by reading the meta data 608 of one record 612 at a time sequentially until record number seventy-four was found. A record 612 of interest can be found by scrolling the tape cassette, such as 304, forward or backward as necessary based on information about each record 612 stored in the meta data 608.

Figure 6C:
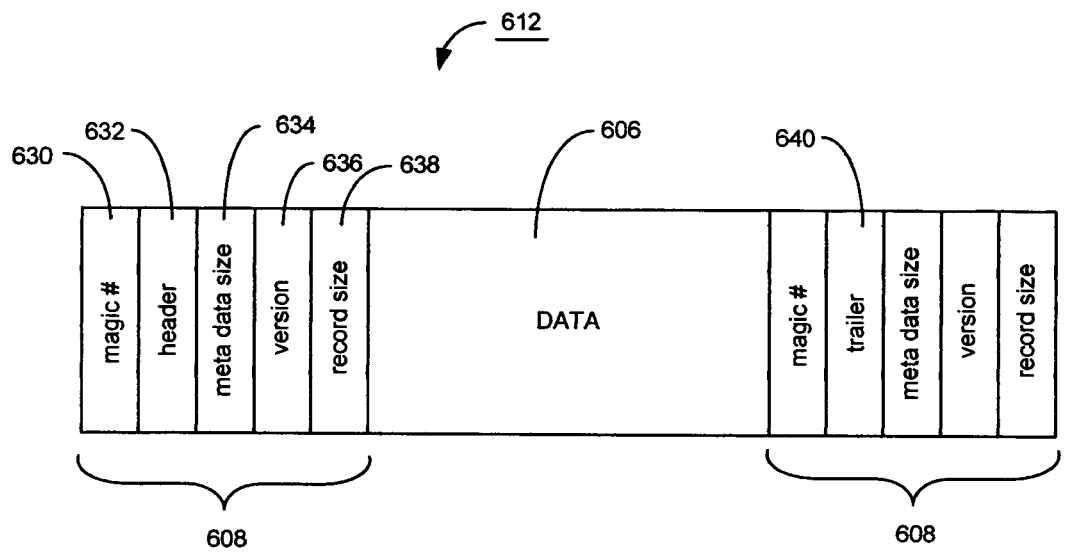
FIG. 6C is a more detailed block diagram of a single record of FIG. 6B.

FIG. 6C is a block diagram of a single record 612 in a detail relationship to FIG. 6B. FIG. 6C is illustrative only and the fields, such as the record size 638, comprising the meta data 608 are not limited to the number of fields or the information content in each field. Here, the meta data 608 is comprised of data fields for and about each record 612 located at both the beginning and end of each record 612, as read from left to right in this example. In this embodiment, the following data fields can include a magic number 630 used to alert the system 106 that a new meta data field 608 has arrived. The meta data header 632 is a data field that informs the system 106 that the meta data 608 precedes the user data 606. Alternatively, the meta data trailer 640 is a data field that informs the system 106 that the meta data 608 follows the user data 606. The meta data trailer 640 is contained in meta data 608 at the end of the record 608 for purposes of scrolling tape media in a cassette 304 in the reverse direction (as read from right to left in this example) to find a specific record 612, for example. The meta data size 634 and record size 638 contain information about the data size of the meta data field 608 and the user data field 606 respectively. The version field 636 contains a revision number which is information specific to the format of the fields in the record 608.

FIGS. 6A and 6B illustrate a typical layout of files 604 for tape media wherein the files 604, and records 612 are sequential and generally contiguous due to the access methodology of tape media. Random access devices, such as disc drives 502, on the contrary, have additional flexibility relative to tape media; they do not require files 604 or records 612 to be stored in a physically sequential or contiguous construction. Disc drives 502 are capable of storing the records 612 of a file 604 or parts of records 612 in different locations on a disc 612. As known to a skilled artisan, this is made possible because a disc drive 502 operates with data directory instructions that contain location information, in what is called a file system generally stored as data in a reserved space for each specific drive 502. The data directory is typically accessed by a file system driver in the operating software that manages the directory stored in the disc drive 502. Hence, a random access non-tape media such as a disc drive 502 uses what is generally known as an operating system data directory wherein the functionality is at the operating system level of a computing system.

Figure 7:
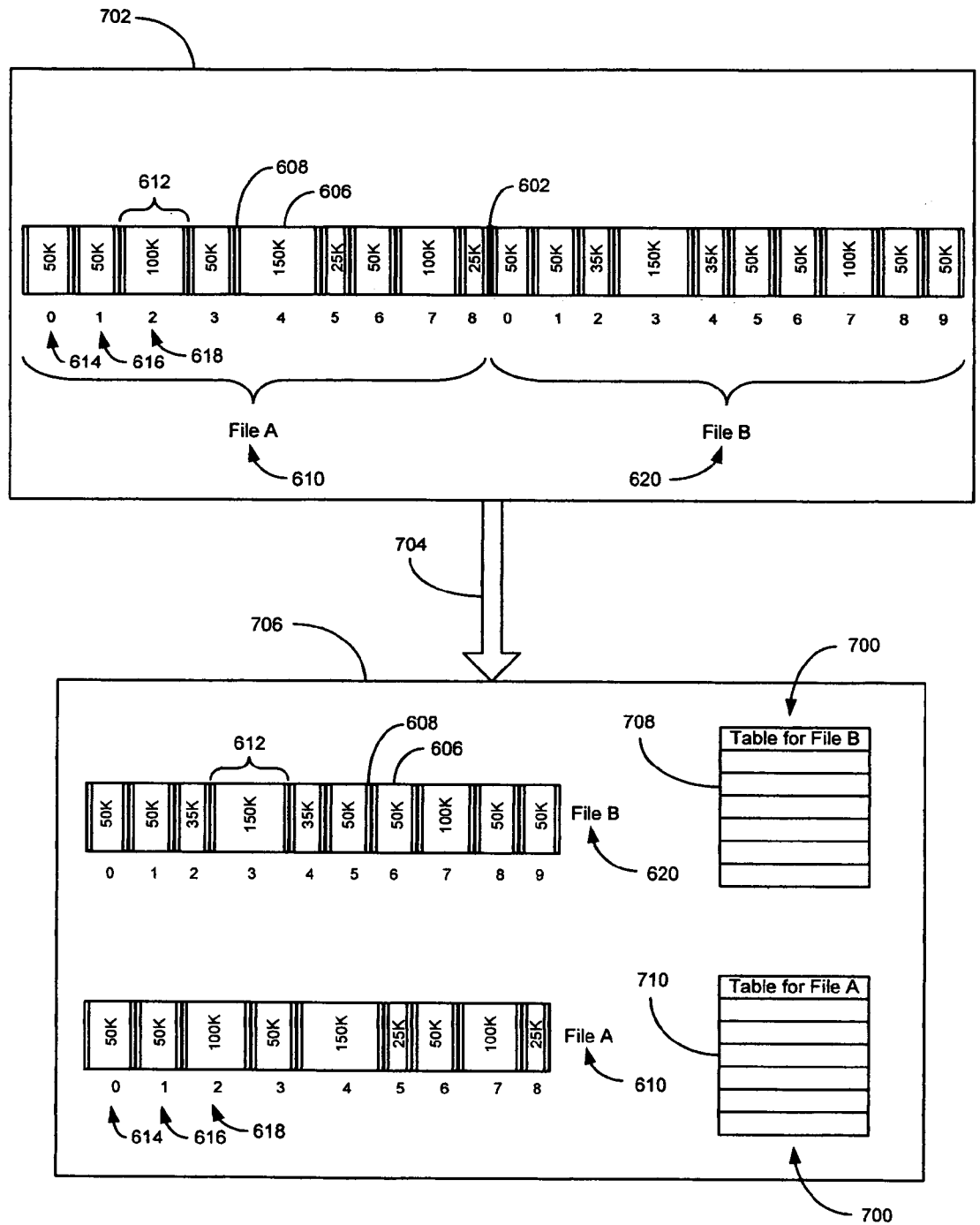
FIG. 7 is a block diagram of an embodiment of the present invention illustrating the transfer of data from a tape medium to a non-tape medium.

Referring now to FIG. 7, shown therein is a block diagram of an embodiment of the present invention illustrating the transfer of data 704 from a tape medium 702 to a non-tape medium 706. The means for storing and retrieving data on a non-tape medium could be performed in a combination storage library, such as 200 for example. Here the tape medium 702 could be a tape cassette, such as 304, containing files 604 as arranged in FIG. 6A. The files 604 could be transferred 704 from the tape cassette 304 to a disc drive magazine 500, for example, where the copied files 604 are no longer constrained to be sequential. Here, each file 604 is saved in the non-tape media 706 as a discrete data entry in a data directory for the file system for example, with the records 612 for each file 604 saved as a block of data in each discrete data entry. In other words, the records 612 are not managed by the data directory and file system, but rather are managed by a table 700 which is separate from the data directory. Further, a program within the storage system different from the file system that uses the data directory, such as the file system driver, is used to manage the table 700. The data directory can have knowledge where the table 700 associated with a particular file 604 is located, however, the data directory does not need to have knowledge of the table 700 entries and in some preferred embodiments such knowledge of table 700 entries would unnecessarily consume storage space on the non-tape media 706. Thus, in one aspect of the present invention, use of tables, such as the table 700, minimizes the amount of locative information needed to identify the specific location of the records 612 on the non-tape media 706. Tables, such as 710 and 708 associated with the respective files A 610 and B 620, could be generated and stored on at least one disc drive 502, for example. The tables 700 are adapted to contain information related to at least one of the records 612 of each of the files 604.

One benefit of generating a table 700 when copying files 604 from a tape medium 702 to a non-tape medium 708 is the efficiency of storing and retrieving information. The means for generating the table 700 could be a software program equipped to handle setting up the components of each table 700 during the data storing 704 operations. In general, files 604 stored on a non-tape medium 706 that is copied from a tape medium 702 is typically stored in a sequential form similar to the tape file configuration 600. In other words, the data is directly copied from tape medium 702 to non-tape medium 706 as a single block of data with generally the same file 604 structure and format as the tape, without entering individual files 604 in the file system. This methodology has advantages in minimizing storage space consumption in the non-tape medium 706 by eliminating excessive data directory entries for every record 612 and every file 604. As a consequence, the copied information stored on the non-tape medium 706 is accessed by consecutively indexing though each file 604 and meta data for each record one at a time. The meta data 608 for each record 612 provides location information for the next record 612, such as the number of bits or bytes to the next record 612 for example. To illustrate the process of finding a particular file 604 and record 612 in a block of data containing multiple files 604 and records 612, a storage system 106 generally goes to the starting point of the block of data and indexes from one record 612 to another based on each record size 638 in the meta data 608. For example, the record size 638 of a first record 612 is determined which enables the system 106 to skip a known amount of data to the position of the meta data 608 of a second record 612 and so on until the desired location is reached. This methodology of indexing through the records 612 can consume time and hence performance for data retrieval, especially in circumstances when there are thousands of records 612 in a single file 604, for example. Therefore, using a look-up table 700, such as by means of accessing the table 700 by a program in a combination library 200 for example, associated with each file 604 to locate the position of a desired record 612 in a desired file 604 can save time.

FIG. 8 shows an embodiment of a table 700, herein, specifically representing file A 610, for purposes of illustration. Here, an example of the base form of a type-1 table 800 lists a column for record size 802 versus a column for number of repetitions 804 for the particular record size 802 in a contiguous and sequential order starting from the first to the last record 612. As shown by the first row 806, there are two contiguous repetitions of 50K (bytes) sized records 612, i.e. two appearing successively. The remainder of the rows has different contiguous record sizes 802, which correspond to a value of one in the repetitions column 804.

Type-1 table 800 could, for example, be accessed by a storage system 106 to find a particular record 612 in a file, such as file A 610, more quickly than conventional methods of sequentially accessing each file 604 and record 612 in order. Hence, an example of this process could be as follows: a host computer 102 could request access to record number seven 808 in file A 610; the storage system 106 could determine record number seven 908 of file A 610 is stored on a particular non-tape media 706; the storage system 106 could then query the look up type-1 table 800 for record number seven 808 under the repetitions column 804; the storage system 106 could then perform a summation operation of record sizes 802 to record number seven 808 but not including record number seven 808; the storage system 106 now having knowledge that record number seven 808 starts at 475K bytes into file A 610 could then direct the particular non-tape media 706 to the position where record number seven 808 starts in file A 610.

FIG. 9 shows an embodiment of an alternative table 710 specifically representing file A 610, for purposes of illustration. Shown herein is an example of the base form of a type-2 table 900 listing a record size running sum column 902, and more specifically in this embodiment, the record size running sum correlating to the starting position of each record 612, and a counter column 904 corresponding to each record in file A 610. Each running sum record size entry, or row, is associated with an incremental count, such as the row containing count number seven and running sum value 475K bytes 910 indicating the position in the saved file 610 where record seven 910 starts.

Type-2 table 900 could, for example, be accessed by a storage system 106 to find a particular record 612 in a file, such as file A 610, more quickly than the type-1 table 800. Hence, an example of this process could be as follows: a host computer 102 could request access to record number seven 910 in file A 610; the storage system 106 could determine record number seven 910 of file A 610 is stored on a particular non-tape media 706; the storage system 106 could then query the look up type-2 table 900 for the count number seven 908 under the counter column 904; the storage system 106 could then read the associated record size running sum 902 corresponding to counter number seven 910; the storage system 106 now having knowledge that record number seven 910 begins at 475K bytes into file A 610 could then direct the non-tape media 706 to the position where record number seven 910 starts in file A 610.

Figure 10:
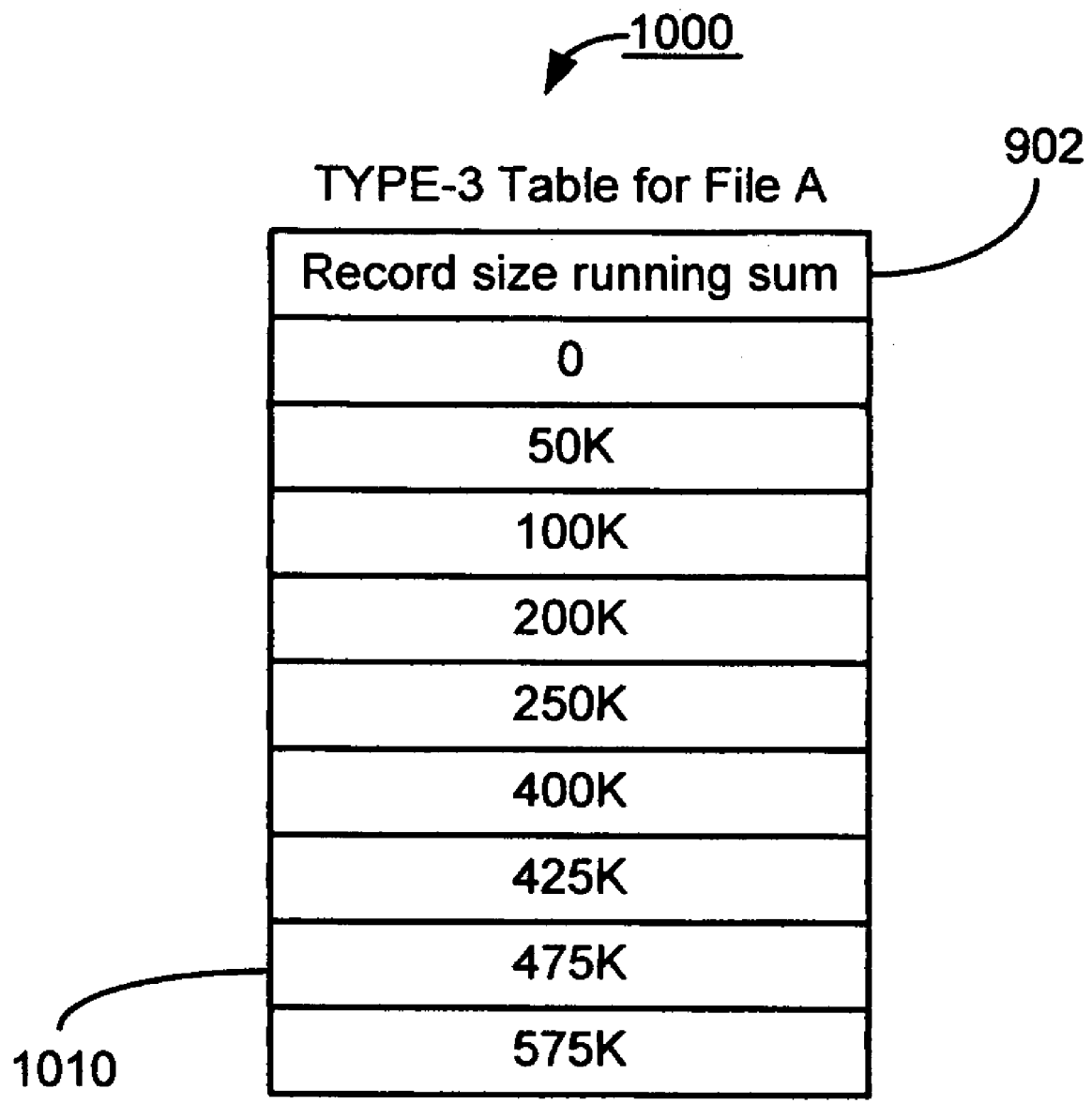
FIG. 10 is a diagram of a base type-3 table constructed in accordance with an embodiment of the present invention.

FIG. 10 shows an embodiment of an alternative table 710 specifically representing file A 610, for purposes of illustration. Shown herein is an example of the base form of a type-3 table 1000 listing a record size running sum column 902, and more specifically, the record size running sum starting position. The record size running sum column 902 comprises rows having a running sum for beginning of each record size in file A 610, such as the seventh row having the running sum value of 475K bytes 1010.

Type-3 table 1000 could, for example, be accessed by a storage system 106 to find a particular record 612 in a file, such as file A 610, with less memory consumed as compared with the type-2 table 900. Hence, an example of this process could be as follows: a host computer 102 could request access to record number seven 1010 in file A 610; the storage system 106 could determine record number seven 1010 of file A 610 is stored on the particular non-tape media 706; the storage system 106 could then query the look up type-3 table 1000 for the seventh entry and read the corresponding record size running sum value of 475K bytes 1010; the storage system 106, for example, now having knowledge that record number seven 1010 begins at 475K bytes into file A 610 could then direct the particular non-tape media 706 to the position where record number seven 1010 starts in file A 610.

In cases where files 604 contain large numbers of records 612, the base forms of the type-1 800, type-2 900 and type-3 1000 tables can become large and, consequently, consume an undesirably large amount of storage space on non-tape media 706. Though table 700 related data consumption, due to the number of entries, is somewhat addressed by the repetition function in the type-1 table 800, the base form of the type-2 900 and type-3 1000 tables are capable of growing prohibitively large. However, the type-2 900 and type-3 1000 tables are easily adaptable to take advantage of compression schemes. Because type-2 900 and type-3 1000 tables are easily adaptable to at least one compressed state, there may be times when it is advantageous to convert a type-1 table 800 to a type-2 900 or type-3 1000 table and then, optionally, compress the type-2 900 or type-3 1000 table. Means for converting and compressing the tables 700, such as the type-1 800, type-2 900 and type-3 1000 tables, can be done by a conversion and compression software engine in the combination library 200, for example.

Figure 11:
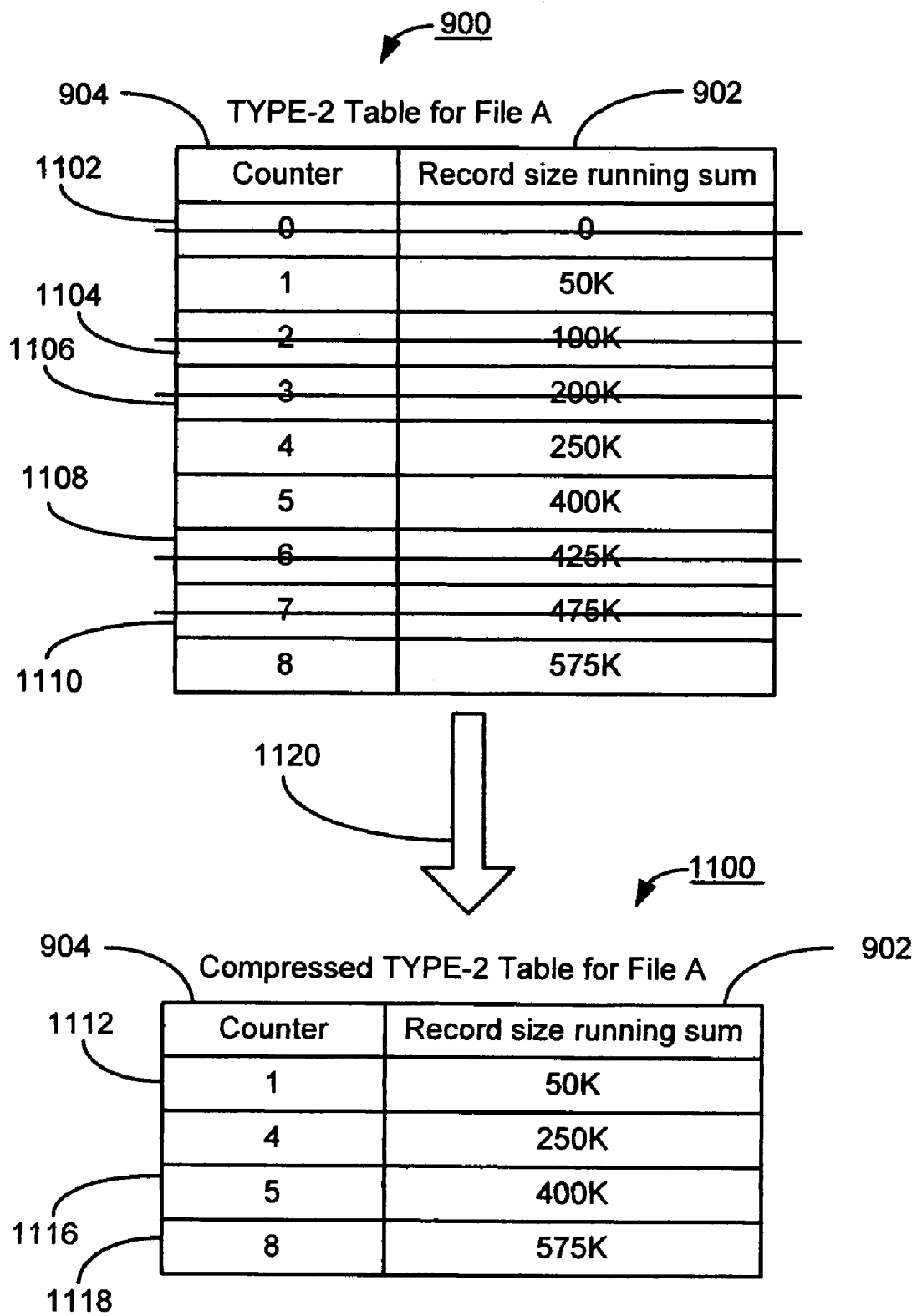
FIG. 11 is a diagram of a compressed form of a type-2 table constructed in accordance with an embodiment of the present invention.

FIG. 11 shows an embodiment of the present invention wherein a compression scheme is applied to a type-2 table 900. In cases when the type-2 table 900 reaches a size threshold, wherein a size threshold could be a predetermined size or alternatively a performance optimization size determined by the storage system 106, just to name two examples, rows in the table 900, such as counter number zero 1102, could be deleted. This is exemplified by the conversion 1120 of the base form of the type-2 table 900 to the compressed form of the type-2 table 1100. A compressed form of the type-2 table 1100 could further be compressed if desirable, for example if additional entries are made and size threshold limitations are once again met. The preservation of the counter information 904 relative to an associated record size running sum value 902, such as the row with counter number one 1112, enables the flexibility of deleting rows to be somewhat random, such as rows number two 1104 and three 1106 for example.

In the event the starting location of a desired record 612 in a file 604 is not immediately available in the compressed type-2 table 1100, an approximate location in the file 604 can be found from a close listed record 612. In this event, the closely positioned record 612 can direct the positioning to a first adjacent record 612 (in front of behind the record of interest) based on relevant information contained in the meta data 608 of the closely positioned record 612. The first adjacent record 612 can then direct, or index, the positioning to a second adjacent record 612 based the information in the meta data 608 of the adjacent record 612 and so on until the desired record, such as record 612 is found.

In an embodiment of the present invention, a compressed type-2 table 1100 could be generated, such as a replacement to the base form of the type-2 table 900 for example, and accessed by a storage system 106 to find a particular record 612 in a file, such as file A 610, with less consumed storage space than the base form of the type-2 table 900. Hence, an example of this process could be as follows: the type-2 table, such as the base form type-2 table 900, could be determined, by the storage system 106 for example, to have reached a suboptimal large size; rows, such as those corresponding to counters zero 1102, two 1104, three 1106, six 1108 and seven 1110 are deleted to convert 1120 to an optimal sized compressed type-2 table 1100 for example; a host computer 102 could request access to record number seven 1110 in file A 610; the storage system 106 could determine record number seven 1110 of file A 610 is stored on a particular non-tape media 706; the storage system 106 could then query the compressed look up type-2 table 1100 for the counter number seven 1110 under the counter column 904; the storage system 106 would then realize that counter number seven 1110 is not in the compressed type-2 table 1100 and would then determine the nearest counter number 904, in this case counter number eight 1118; the storage system 106 would go to the position 575K bytes in file A 610 corresponding to the starting location of record number eight 1118 and from the meta data in record number eight 1118 determine that the size of meta data 608 for file A 610 and direct the storage system 106 to the start of the meta data 608 containing the trailer 640; the meta data 608 containing the trailer 640 also contains the record size, which is 100K in this case, can then provide information on the starting position (475K bytes) of record seven 1110. Alternatively, counter number five 1116 could be chosen as an approximate starting location and based on the disclosed philosophy, index forward two records 612 by reading record five 1116 meta data 608 and then record six 1108 meta data 608.

Figure 12:
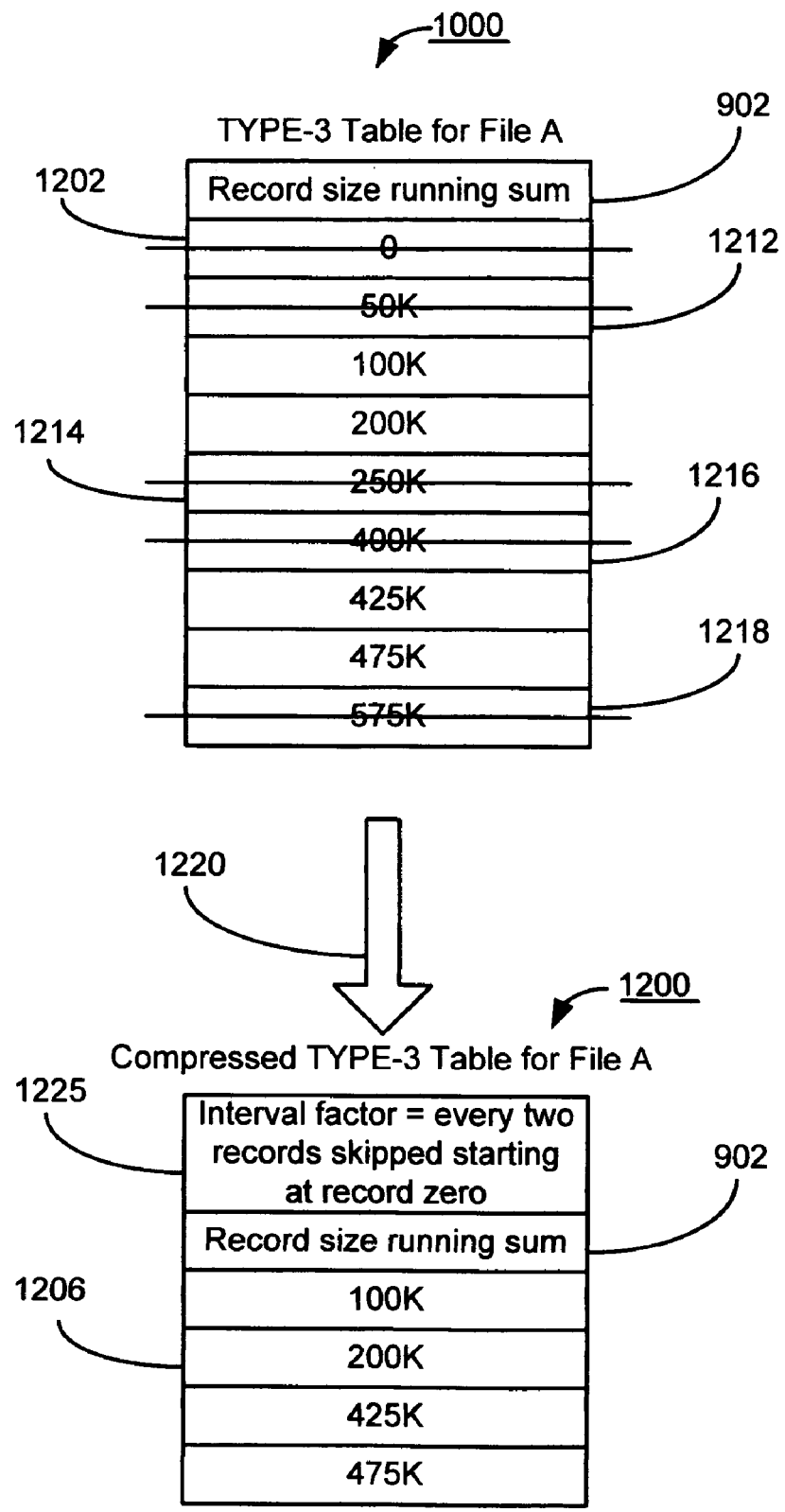
FIG. 12 is a diagram of a compressed form of a type-3 table constructed in accordance with an embodiment of the present invention.

FIG. 12 shows an embodiment of the present invention wherein a compression scheme is applied to a type-3 table 1000. In cases when the type-3 table 1000 reaches a size threshold, wherein a size threshold could be a predetermined size or alternatively a performance optimization size determined by the storage system 106, just to name two examples, rows in the table 1000, such as the first 1202 and second entry 1212, could be deleted in a predictable interval, followed by fifth 1214, sixth 1216 and ninth 1218 entries. This is exemplified by the conversion 1220 of the base form of the type-3 table 1000 to the compressed form of the type-3 table 1200. A compressed form of the type-3 table 1200 could further be compressed if, for example additional entries are made and size threshold limitations are once again met. The compressed type-3 table 1200 uses an interval factor 1225 associated with the table 1200 to take into account the record number associated with each running sum value 902. In the event the starting location of a desired record 612 in a file 604 is not immediately available in the compressed type-3 table 1200, an approximate location in the file 604 can be found from a close listed record 612. In this event, the closely positioned record 612 can direct the positioning to a first adjacent record 612 based on relevant information contained in the meta data 608 of the closely positioned record 612. The first adjacent record 612 can then direct, or index, the positioning to a second adjacent record 612 based the information in the meta data 608 of the adjacent record 612 and so on until the desired record 621 is found.

In an embodiment of the present invention, a compressed type-3 table 1200 could be generated, such as a replacement to the base form of the type-3 table 1200 for example, and accessed by a storage system 106 to find a particular record 612 in a file, such as file A 610, with less consumed storage space than the base form of the type-3 table 1000. Hence, an example of this process could be as follows: the type-3 table, such as the base form type-3 table 1000, could be determined, by the storage system 106 for example, to have reached a suboptimal large size; rows, such as those corresponding to starting location of running sum record sizes 0 bytes 1202, 50K bytes 1212, 250K bytes 1214, 400K bytes 1216 and 575K bytes 1218 are deleted to convert 1220 to an optimal sized compressed type-3 table 1200 having an interval factor equating to every two running sum record size entries skipped starting at the corresponding first record entry 1202; a host computer 102 could request access to record number four 1214 in file A 610; the storage system 106 could determine record number four 1214 of file A 610 is stored on a particular non-tape media 706; the storage system 106 could then query the compressed look up type-3 table 1200 for the fifth entry as adjusted by the interval factor 1225 corresponding to record number four 1214 and discover that its 1214 starting running sum value is no longer listed; the storage system 106 could then determine that the nearest listed starting location relative to record number four 1214 is record number three 1206 starting at 200K bytes into file A 610; the storage system 106 would go to the position 200K bytes in file A 610 corresponding to the starting location of record number three 1206 and from the meta data in record number three 1206 determine that the size of record number three is 50K bytes; the storage system 106 could then generate a new running sum value of 250K bytes (i.e. 200K bytes+50K bytes) thus determining the starting position of record number four 1214 and directing the particular non-tape media 706 to the position where record number four 1214 starts in file A 610.

Figure 13:
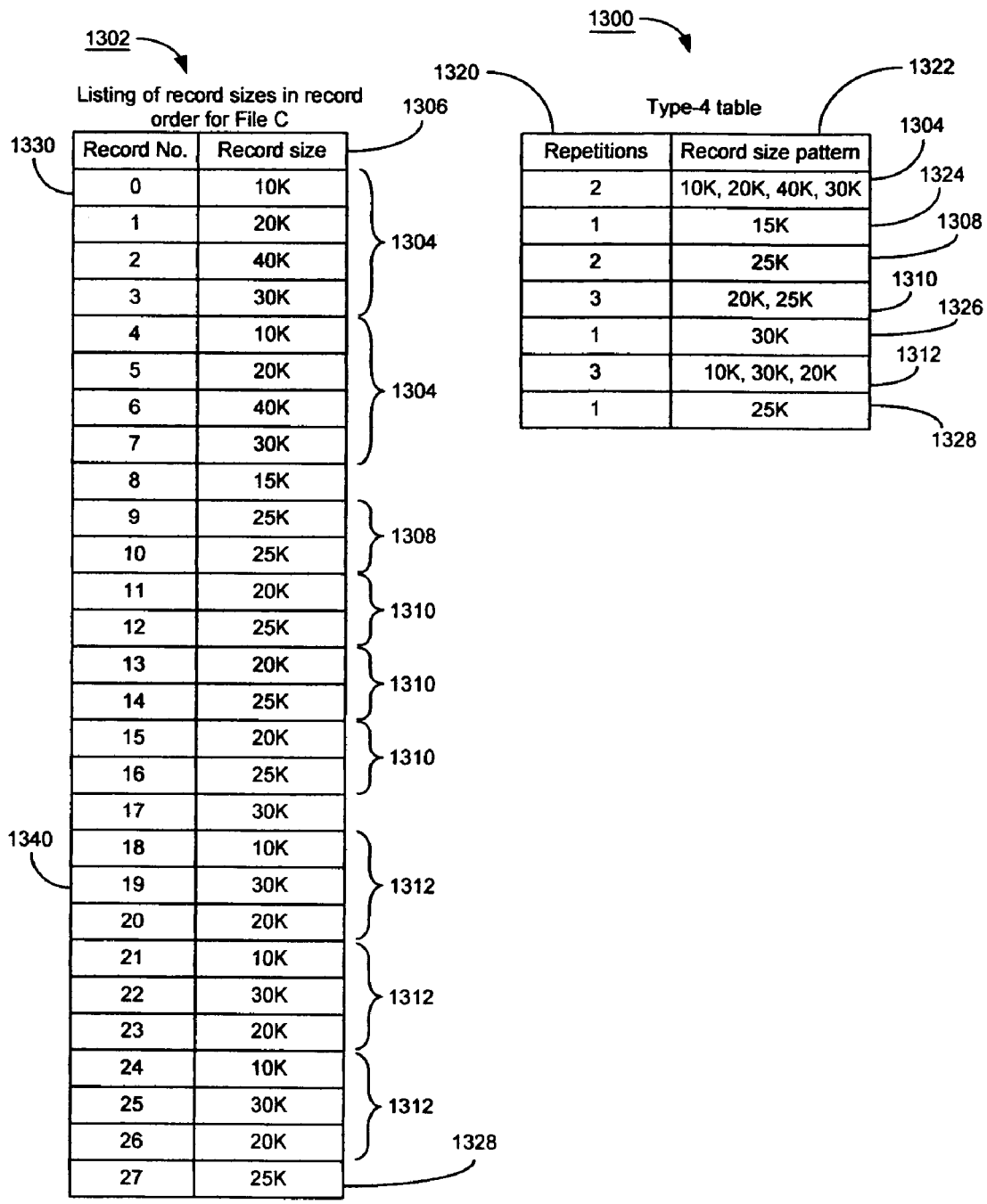
FIG. 13 is a diagram of a type-4 table constructed in accordance with an embodiment of the present invention.

FIG. 13 is a diagram of a type-4 table 1300 constructed in accordance with an embodiment of the present invention. Here, an example of a type-4 table 1300 comprises a listing of sequentially repeating record size patterns 1322 versus the number of repetitions of the patterns 1320 in the order starting from the first record 1330 to the last record 1328 associated with file C 1302. File C 1302 is a tabulated listing of record sizes 1306 in order from the first record 1330 to last 1328. Referring to the type-4 table 1300, the first row lists two repetitions of a pattern of record sizes 10K bytes, 20K bytes, 40K bytes and 30K bytes 1304. The second row of the table 1300 lists only one entry for record size 15K bytes 1324. The third row of the table 1300 lists two entries for record size 25K bytes 1308. The forth row of the table 1300 lists three entries for the pattern of record sizes 20K bytes and 25K bytes 1310. The fifth row of the table 1300 lists only one entry for record size 30K bytes 1326. The sixth row of the table 1300 lists three entries for the pattern of record sizes 10K bytes, 30K bytes and 20K bytes 1312. And, the seventh row of the table 1300 lists only one entry for record size 25K bytes 1328.

The type-4 table 1300, for example, could be accessed by a storage system 106 to find a particular record 612 in a file 604, such as file C 1302, more quickly than conventional methods of sequentially accessing each record 612 and meta data 608 of each file 604 in order. Hence, an example of this process could be as follows: a host computer 102 could request access to record number nineteen 1340 in file C 1302; the storage system 106 could determine record number nineteen 1340 of file C 1302 is stored on a particular non-tape media 706; the storage system 106 could then query the look up type-4 table 1300 for record number nineteen 1340 by counting the repetitions 1320 with the number of entries listed in the record size pattern column 1322 until the nineteenth entry is found; the storage system 106 could then perform a summation operation of record sizes in the record size pattern column 1322 to record number nineteen 1340; the storage system 106 now having knowledge that record number nineteen 1340 starts at 440K bytes into file C 1302 could then direct the particular non-tape media 706 to the position where record number nineteen 1340 starts in file C 1302.

Figure 14:
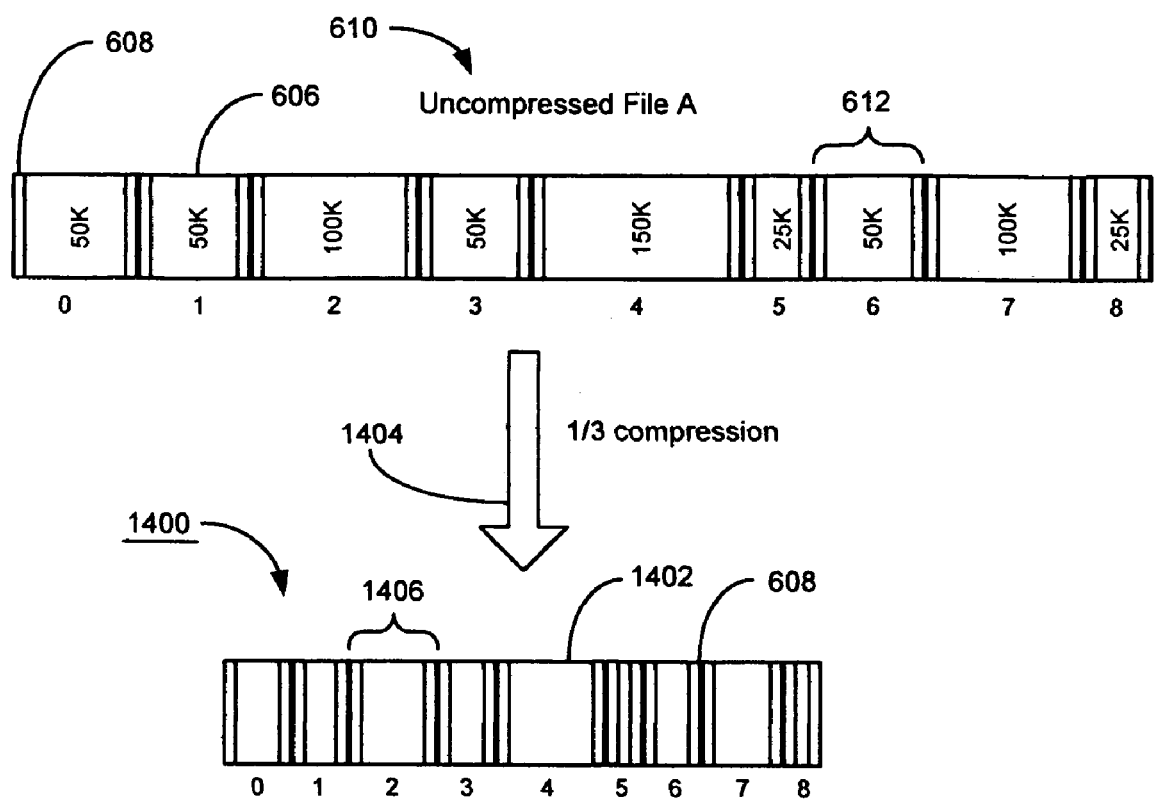
FIG. 14 is a block diagram of an uncompressed file A compressed to a ⅓ compressed user data and uncompressed meta data file A constructed in accordance with an embodiment of the present invention.

FIG. 14 shows another embodiment of the present invention wherein a table 700 is used with uncompressed meta data 608 and compressed user data 1402 in a compressed file 1400. Here, user data 1402 can exist in a compressed state (⅓ compression 1404), which for example could be generated by a hardware compression engine, such as from a chip like the ALDC (Adaptive Lossless Data Compression) AHA3580 single-chip CMOS lossless compression and decompression integrated circuit coprocessor capable of 80 Mbytes/second ALDC by Comtech AHA Corporation of Pullman, Wash. The host 102 could send streaming data 104 to the storage system 106 whereby the data 104 is transformed in a compressed state 1400 by the chip for storing in the storage system 106. This kind of compression has been termed on-the-fly compression by those skilled in the art. In addition to on-the-fly compression, there are a variety of alternative compression methods, such as software or firmware compression algorithms. In addition, locations where the compression is performed can also vary, for example compression could be preformed in the storage system 106, the host 102, an intermediate location, or between storage systems 106, just to name a few.

There are advantages to having uncompressed meta data 608 with compressed user data1 1402. For example, a record 1406 comprising uncompressed meta data 608 and compressed user data 1402 having the record size field 638 reflect the compressed record 1406 can enable the quick use of the table 700 for the compressed file 1400 with the same efficiency as disclosed above. In an alternative embodiment, the meta data 608 can also be compressed, however there may require at least one decompression operation to extract information in the meta data 608 for use with the table 700.

Figure 15:
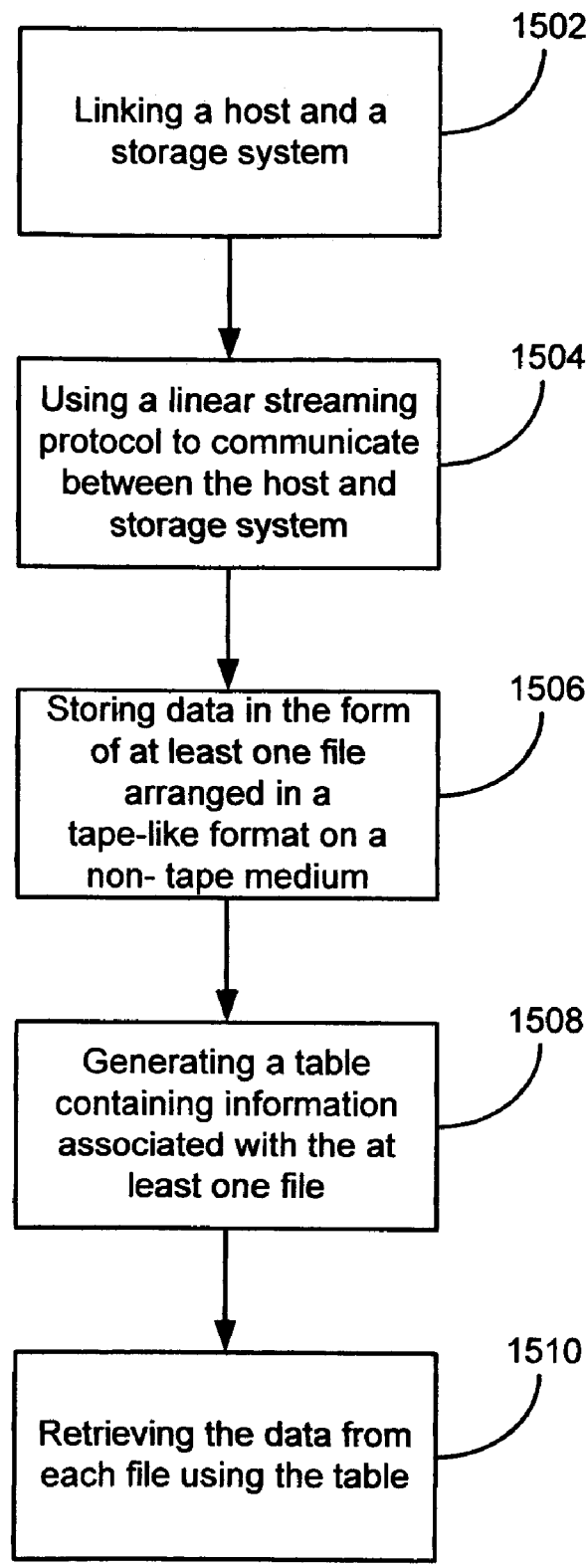
FIG. 15 shows a flow diagram of a method for generating a table for at least one file saved on a non-tape medium and retrieving data from the table in accordance with an embodiment of the present invention.

FIG. 15 illustrates a method for improving performance in a data storage arrangement, such as 100. It should be recognized that the steps presented in this embodiment of the present invention do not require any particular sequence. In step 1502, a host computer, such as 102, and a storage system, such as 106, are linked by a communications path, such as 104. Step 1504 is a block showing the use of a streaming protocol, such as a SCSI tape protocol, by which the host 102 and the storage system 106 communicate. As shown by step 1506, the data is stored on a non-tape medium 706 in the form of at least one file 604 wherein each file 604 comprises a plurality of records 612 each having user data 606 and meta data 608. In step 1508, a table 700 associated with the at least one file 604 containing information related to at least one of the records 612 in the at least one file is generated. Step 1510 is a step involving retrieving the data saved on the non-tape media 700 for each of the at least one files 604 using the table (or tables) 700. In a preferred embodiment, the retrieving step 1510 is done by the storage system 106.

Figure 16:
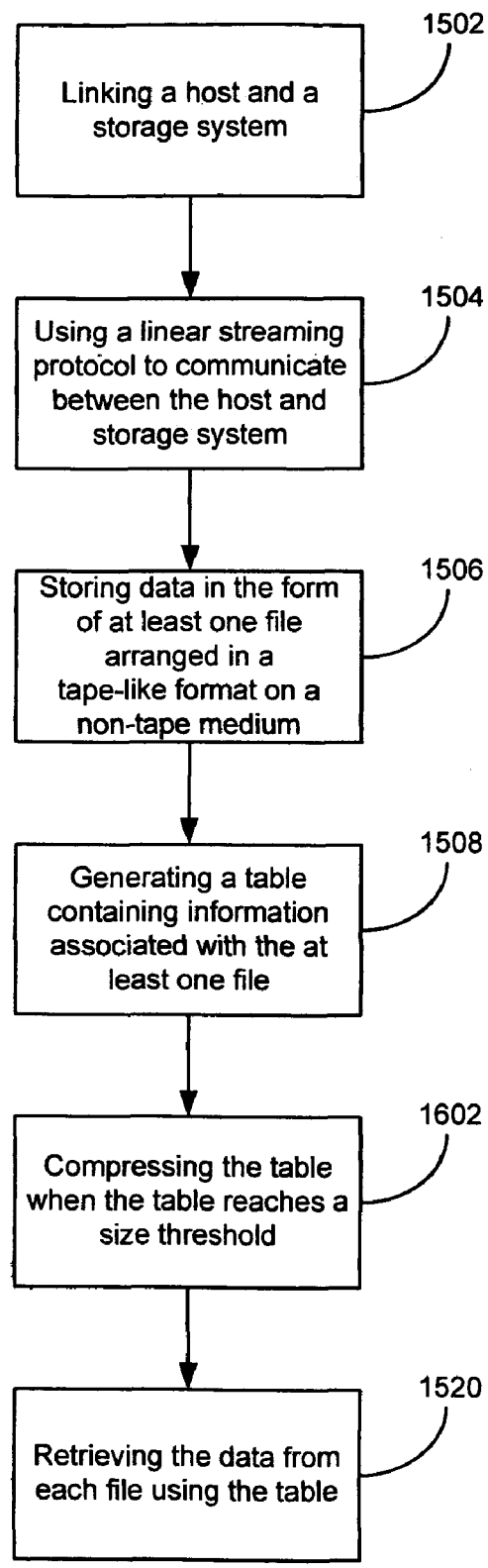
FIG. 16 shows an alternative embodiment of FIG. 15 wherein a step for compressing the table is added in accordance with an embodiment of the present invention.

FIG. 16 is an alternative embodiment of the present invention which includes method steps 1502, 1504, 1506, 1508 and 1510 from FIG. 15. Step 1602 is a block showing the compression of a table 700 when the table reaches a size threshold. In one embodiment of the present invention, the size threshold could be a predetermined size set by the host or a manufacturer of the storage system, for example. In another embodiment, an optimization algorithm could be employed wherein the table size could be determined depending on the amount of free data space existing on a non-tape media 706 at any given time. In yet another embodiment of the present invention, the table 700 could be converted to a type-2 900 or type-3 1000 table and if maximum size threshold conditions are met, the converted table 900 or 1000 could be compressed.

Embodiments of the present invention could be commercially practiced with a combination storage library system 200 such as a Spectra Logic T950 library produced by Spectra Logic Corporation of Boulder, Colo. The T950 library can support both tape media, such as an IBM LTO-2 cassette from IBM Corporation of Dallas, Tex., configured in a cassette 304 and magazine 402 configuration, and disc drives 502, such as the Seagate 3.5 inch Barracuda Line disc drives by Seagate Corporation of Scottsvalley, Calif., configured in a removable disc drive magazine 500, such as a Spectra Logic RXT disc drive magazine. A host computer 102 is generally configured to communicate with the an RXT docking station, which operates as a drive for the RXT disc drive magazine configured to be part of the T950 library, and more specifically to the RXT disc drive magazine by means of a SCSI tape protocol which is a specific streaming protocol. Hence, based on the communication protocol, the RXT docking station and all of the drives and media in the T950 appears as a classic tape library to the host 102. The T950 library is equipped with a computing system wherein the means of locating and managing each individual data entry, in this case a file 604 and associated table 700, is by using an operating system having file system firmware.

The T950 could support operations like copying thousands of files 604, wherein each file 604 may contain thousands of records 612, from an entire LTO-2 cassette to an RXT disc drive magazine internally. The LTO-2 cassette could support files 604 stored in the format generally described in FIGS. 6A, 6B and 6C. Upon copying the data from the LTO-2 cassette to the RXT disc drive magazine, the files 604 would be stored as complete blocks of data including the user data 606 and meta data 608 of each record stored in each file 604. Each file 604 would be saved as a discrete data entity in the disc drive file system along with a table 700 associated with each file 604.

The RXT disc drive magazine could initially save each table 700 associated with each file 604 as a type-1 table 800. Upon reaching a size threshold, such as 612 bytes, or 50 entries, wherein each row could be twelve bytes long in a type-1 table 800, reserving twelve bytes for table identification purposes, the type-1 table 800 would automatically be converted to a type-3 table 1000. A type-3 table 1000 could be configured to have twelve bytes for identification purposes and only eight bytes per entry; hence the type-3 table 1000 could support 75 entries. If once again, the 612 bytes threshold was met, the RXT docking station could reduce the size of the type-3 table 1000 by regenerating a compressed type-3 table 1200 with every other entry deleted. The compressed type-3 table 1200 would also include an interval factor 1225 associated with the table 1200 accounting for every other entry being deleted. A specific file 604 and record 612 could be requested by the host 102 using SCSI tape protocol commands where upon the RXT disc drive magazine could be accessed to produce the requested file 604 and associated table 1200 quickly from the file system used with the disc drive/s 502. The RXT docking station would determine that the table 700 is a compressed type-3 table 1200 with an interval factor 1225 indicating every other entry has been deleted. The RXT docking station would determine the closest record 612 to the record 612 of interest and if necessary, use the meta data 608 in the closest record 612 of interest to locate the record 612 of interest. The record 612 of interest could then be delivered to the host 102.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular tables, such as 700, may vary depending on the particular geometry of the files, such as 604, and the way the tables 700 and files 604 are accessed may vary depending on the storage systems, such as 106, while maintaining substantially the same functionality without departing from the scope and spirit of the present invention. In addition, although the preferred embodiments described herein are directed to storage libraries and related technology, it will be appreciated by those skilled in the art that the teachings of the present invention can be applied to other systems, such as a single disc drive 502, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A data storage arrangement comprising:
    a host computer;
    a storage system in communication with said host computer, said storage system comprising at least one magnetic disc drive containing at least one file wherein said at least one file comprises a plurality of records, each of said plurality of records containing at least both user data and meta data, said meta data comprising data fields for and about an associated record of said records, and wherein said communication is by streaming protocol;
    a table, separate from said file, associated with said at least one file wherein said table is adapted to contain information related to at least one of said records,
    wherein said table is selected from a group of tables essentially consisting of: a type I, type II or type III table,
    wherein the type-1 table comprises a listing having number of repetitions of record size versus said record size in a contiguous order starting from a first record to a last record of said records associated with said at least one file,
    wherein the type-2 table comprises a listing of record sizes in a running sum associated with said at least one file in order from a first of said records to a last of said records and wherein said listing also has a counter corresponding to each successive record,
    wherein the type-3 table comprises a listing of progressively summed record sizes associated with said at least one file in order from a first of said records to a last of said records; and
    an operating system level data directory having knowledge of said at least one file and where said table is located in said storage system.

2. The storage arrangement of claim 1 wherein said table is configured in a compressed format.

3. The storage arrangement of claim 1 wherein
    said type-1 table is converted to a type-2 table comprising a listing of record sizes in a running sum associated with said at least one file in order from a first of said records to a last of said records and wherein said listing also has a counter corresponding to each successive record when said type-1 table reaches a size threshold.

4. The storage arrangement of claim 1 wherein some portion of said listing of said type-2 table is deleted upon reaching a size threshold of said listing.

5. The storage arrangement of claim 1 wherein said listing of progressively summed record sizes are deleted in predictable intervals upon reaching a size threshold of said listing wherein an interval factor accounting for said predictable intervals corresponds with said type-3 table.

6. The storage arrangement of claim 1 wherein said type-1 table is converted to a type-3 table comprising a listing of progressively summed record sizes associated with said at least one file in order from a first of said records to a last of said records when said type-1 table reaches a size threshold.

7. The storage arrangement of claim 1 wherein said group further consists essentially of a type-4 table comprising a listing of sequentially repeating record size patterns versus number of repetitions of said patterns starting from a first record to a last record of said records associated with said at least one file.

8. The storage arrangement of claim 1 wherein any of said records are accessible in said file without use of said table.

9. The storage arrangement of claim 1 wherein said at least two of said records are stored contiguously.

10. The storage arrangement of claim 1 wherein said meta data is in an uncompressed state and said user data is in a compressed state.

11. A method for improving performance in a data storage arrangement comprising:
    linking a host computer with a storage system;
    communicating with said storage system by said host computer with a streaming protocol;
    storing data to and retrieving data from a magnetic disc drive in a form of at least one file containing a plurality of records, each of said records containing user data and meta data;
    generating a table associated with said at least one file, said table containing information related to at least one of said records associated with said at least one file,
    wherein said table is selected from a group of tables essentially consisting of: a type I, type II or type III table,
    wherein the type-1 table comprises a listing having number of repetitions of record size versus said record size in a contiguous order starting from a first record to a last record of said records associated with said at least one file,
    wherein the type-2 table comprises a listing of record sizes in a running sum associated with said at least one file in order from a first of said records to a last of said records and wherein said listing also has a counter corresponding to each successive record,
    wherein the type-3 table comprises a listing of progressively summed record sizes associated with said at least one file in order from a first of said records to a last of said records;
    using an operating system level data directory for locating said at least one file and said table in said storage system.

12. The method of claim 11 further comprising accessing said table to enhance said retrieving data.

13. The method of claim 11 further comprising compressing said table is in a compressed format.

14. A data storage arrangement comprising:
    means for communicating between a host computer and a storage system with a streaming protocol;
    means for storing data to and retrieving data from a magnetic disc drive in a form of at least one file containing a plurality of records, each of said records containing user data and meta data;
    means for generating a table associated with said at least one file containing information related to at least one of said records associated with said at least one file;
    means for converting said table to a listing of record sizes in a running sum associated with said at least one file in order from a first of said records to a last of said records and wherein said listing also has a counter corresponding to each of said records successively;
    and means for compressing said table upon reaching a predetermined size limit;
    and means for using an operating system level data directory for locating said at least one file and said table in said storage system.

15. The means of claim 14 further comprising means for accessing said table to enhance said means for retrieving data.

16. The means of claim 14 further comprising means for converting said table to a type-3 table comprising a listing of progressively summed record sizes associated with said at least one file in order from a first of said records to a last of said records and means for compressing said table upon reaching a predetermined size limit.

17. The means of claim 14 further comprising means for compressing said table upon reaching a predetermined size limit.

18. A method comprising:
transferring data from a tape medium in a tape medium format to the magnetic disc drive;
storing the data to the magnetic disc drive in the tape medium format after the data has been transferred; and
creating at least one table that is compressible to be selected from a group essentially consisting of a type-1 table, a type-2 table, or a type-3 table,
wherein the type-1 table comprises a listing having number of repetitions of record size versus said record size in a contiguous order starting from a first record to a last record of said records associated with said at least one file,
wherein the type-2 table comprises a listing of record sizes in a running sum associated with said at least one file in order from a first of said records to a last of said records and wherein said listing also has a counter corresponding to each successive record,
wherein the type-3 table comprises a listing of progressively summed record sizes associated with said at least one file in order from a first of said records to a last of said records.

* * * * *